United States Patent
Zelmer et al.

(10) Patent No.: US 8,400,242 B2
(45) Date of Patent: Mar. 19, 2013

(54) PARK LOCK SOLENOID

(75) Inventors: Elizabeth A. Zelmer, Cary, NC (US); David W. Rawls, Cary, NC (US); Alan F. Grouse, Cary, NC (US)

(73) Assignee: Johnson Electric S.A., La Chaux-De-Fonds (CH)

( * ) Notice: Subject to any disclaimer, the term of this patent is extended or adjusted under 35 U.S.C. 154(b) by 403 days.

(21) Appl. No.: 12/626,997

(22) Filed: Nov. 30, 2009

(65) Prior Publication Data

US 2010/0156582 A1    Jun. 24, 2010

Related U.S. Application Data

(60) Provisional application No. 61/118,712, filed on Dec. 1, 2008.

(51) Int. Cl.
*H01F 7/80* (2006.01)
(52) U.S. Cl. ........................................ 335/220; 335/282
(58) Field of Classification Search ................... 335/220
See application file for complete search history.

(56) References Cited

U.S. PATENT DOCUMENTS

| | | | | |
|---|---|---|---|---|
| 4,887,702 A * | 12/1989 | Ratke et al. | ..................... | 477/96 |
| 5,504,468 A * | 4/1996 | Hattori et al. | ................. | 335/278 |
| 5,677,658 A * | 10/1997 | Osborn et al. | ................ | 335/228 |
| 6,676,564 B2 * | 1/2004 | Gruden | ........................... | 477/96 |

* cited by examiner

*Primary Examiner* — Elvin G Enad
*Assistant Examiner* — Lisa Homza
(74) *Attorney, Agent, or Firm* — Martin Fleit; Paul D. Bianco; Fleit Gibbons Gutman Bongini & Bianco PL

(57) ABSTRACT

A solenoid for a park lock mechanism wherein an annular frame has a reduced diameter at one end and receives a bobbin with a coil wound thereon with the bobbin projecting outward of the coil at one end and defining an integral bearing positioned in the one end of the annular frame. A magnetic permeable sintered metal bushing is interposed between the integrated bearing of the bobbin and the one end of the annular frame. A plunger is received in the bobbin for sliding movement relative thereto. The plunger has a first reduced section at one end that includes an element for connecting to a shifter and a second reduce section at its other end that projects out of said bobbin. The solenoid has two operating conditions, a first condition in which no magnetic force is applied to the plunger and a connected shifter is locked, and a second condition in which magnetic force is applied to the plunger and a connected shifter is unlocked for shifting. A manual release is provided for coacting with the plunger for putting the solenoid into the second condition in the absence of power.

15 Claims, 4 Drawing Sheets

PARK LOCK SOLENOID

CROSS REFERENCE TO RELATED APPLICATIONS

This non-provisional patent application claims benefit under 35 U.S.C. §119(e) of U.S. Provisional Application No. 61/118,712 filed Dec. 1, 2008, the entire content of which is incorporated herein by reference.

FIELD OF THE INVENTION

This invention relates to a solenoid, and in particular, to a solenoid for use in a park lock mechanism for an automatic transmission in a vehicle.

BACKGROUND OF THE INVENTION

Solenoids are commonly used to power park lock mechanisms for automatic transmissions for vehicles, especially in an automatic transmission floor shifter to lock the shifter when it is in park. The park lock mechanism prevents the gear selector stick from being moved out of the park position except under certain predetermined conditions. This helps prevent the transmission from being engaged accidentally. Prior art solenoids have complex constructions, which have difficult and costly assembly causing potential quality, reliability and cost issues.

The requirements in the automotive industry for this solenoid are strict as it is considered a safety item. Hence reliability is a major concern. Assembly difficulties are a source of reliability issues. Complex structures increase the cost. Noise is another major customer concern.

Hence there is a desire for a solenoid for use in a park lock mechanism which is easy to assemble, thereby reducing the chance of failure and reducing costs.

SUMMARY OF THE INVENTION

It is a principal object of the present invention to provide a novel park lock solenoid, the construction of which facilitates ease of assembly and compliance to shifter system performance requirements, especially regarding noise.

Accordingly, in one aspect thereof, the present invention provides a solenoid for a park lock mechanism comprising: an annular frame having a reduced diameter at one end; a bobbin with a coil wound thereon with the bobbin projecting outward of the coil at one end and defining an integral bearing; the bobbin received in the annular frame with its integral bearing positioned in said one end of the annular frame; a plunger received in said bobbin for sliding movement relative thereto; said plunger having a first reduced section at one end and a second reduced section at its other end that projects out of said bobbin; said first reduced section including an element for connecting to a shifter; said solenoid having two operating conditions, a first condition in which no magnetic force is applied to the plunger and a connected shifter is locked, and a second condition in which magnetic force is applied to the plunger and a connected shifter is unlocked for shifting, and a spring biases the plunger to place the solenoid in the first condition.

Preferably, a magnetic permeable sintered metal bushing is interposed between the integrated bearing of the bobbin and the one end of the annular frame.

Preferably, a connector housing is provided for the annular frame and solenoid, said connector housing providing a bearing for holding the second reduced section of the plunger.

Preferably, the bobbin supports terminals for connecting the coil to supply leads, the terminals being received in the connector housing.

Preferably, a manual release coacting with the plunger is provided for putting the solenoid into the second condition in the absence of power.

Preferably, the second reduced section of the plunger is provided with a groove and a retaining clip is received in the groove and coacts with the manual release.

Preferably, the manual release is comprised of an L-shaped lever that is pivotally mounted on the solenoid with one leg being the actuating leg and the other leg coacting with the plunger for unlocking the solenoid.

Preferably, a spring integrally formed with the lever, biases the lever to a locked position.

Preferably, a U-shaped magnetically permeable washer is located about one end region of the bobbin adjacent the second end of the annular frame.

Preferably, a bumper coacts with the spring and the plunger to reduce noise and absorb impact.

Preferably, a bumper is mounted on the second reduced section of the plunger to reduce noise and absorb impact as the solenoid returns to the first condition.

Other and further advantages of the present invention will become apparent from the following detailed description of a preferred embodiment of the invention when taken in conjunction with the appended drawing.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labelled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENT

Figure 1:
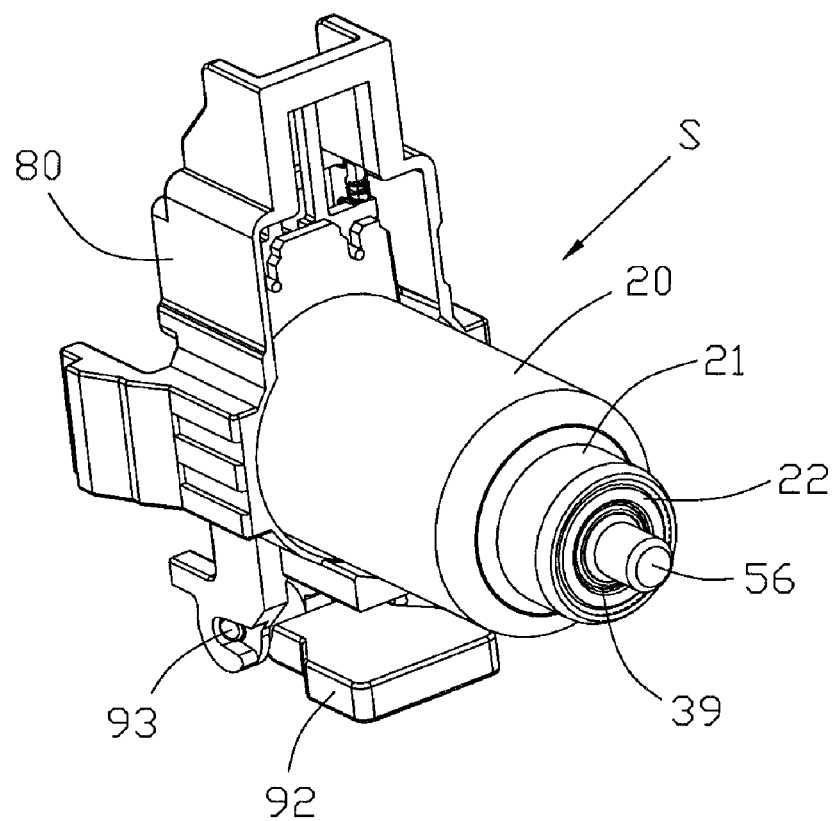
FIG. 1 is a perspective view of a solenoid according to a preferred embodiment.

FIG. 1 illustrates a preferred solenoid S, a high side-load (3200N) solenoid, according to the present invention for use in a park lock mechanism. The solenoid S provides a movable pin or bolt 56 which prevents the gear lever, shift or stick, associated with the park lock solenoid, from being moved out of the park position, unless certain conditions are met. The purpose of such a design is to prevent accidental engagement of the transmission.

Figure 2:
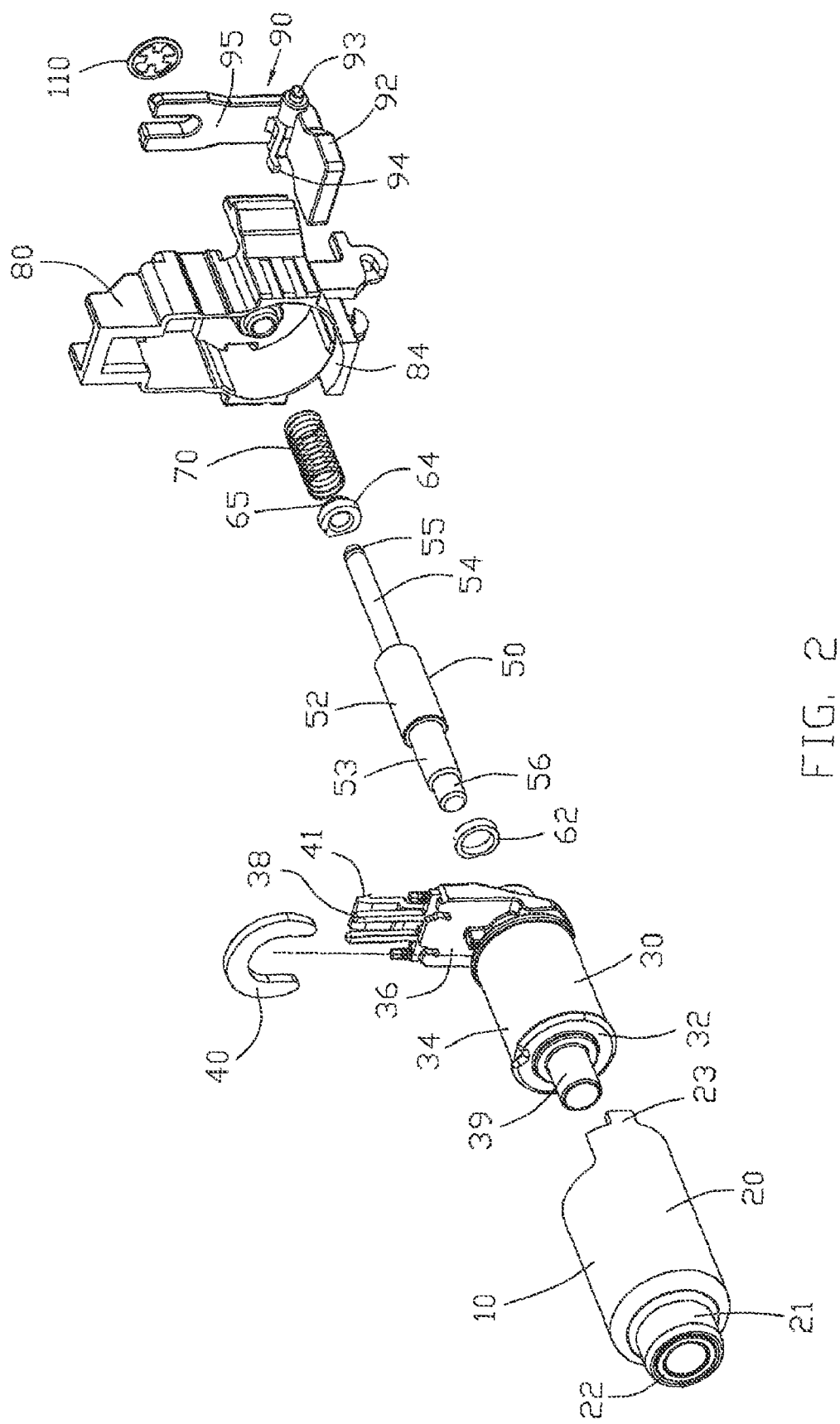
FIG. 2 is an exploded view of the solenoid of FIG. 1.

The solenoid S is shown exploded in FIG. 2 to identify the major parts. The solenoid assembly consists of a frame assembly 10 composed of a frame 20 and a bushing 22; and a coil assembly 30 composed of a bobbin 32, a coil 34 wound on the bobbin, an integral housing 36 and terminals 38 for connecting the coil 34 to a source of power; a flux ring 40; a plunger 50; a pair of bumpers 62 and 64; a spring 70; a connector housing 80; a manual release lever 90; and a retaining clip 110. The solenoid may include an electrical noise suppression device 35 fitted to the coil assembly and electrically connected to the terminals.

Figure 4:
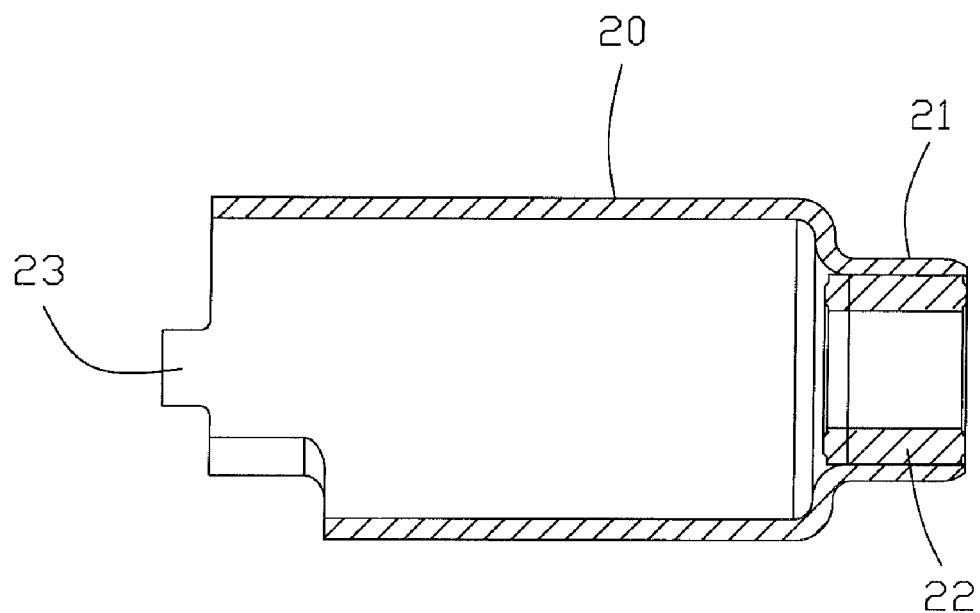
FIG. 4 is a sectional view of a frame assembly being a part of the solenoid of FIG. 1.
Figure 3:
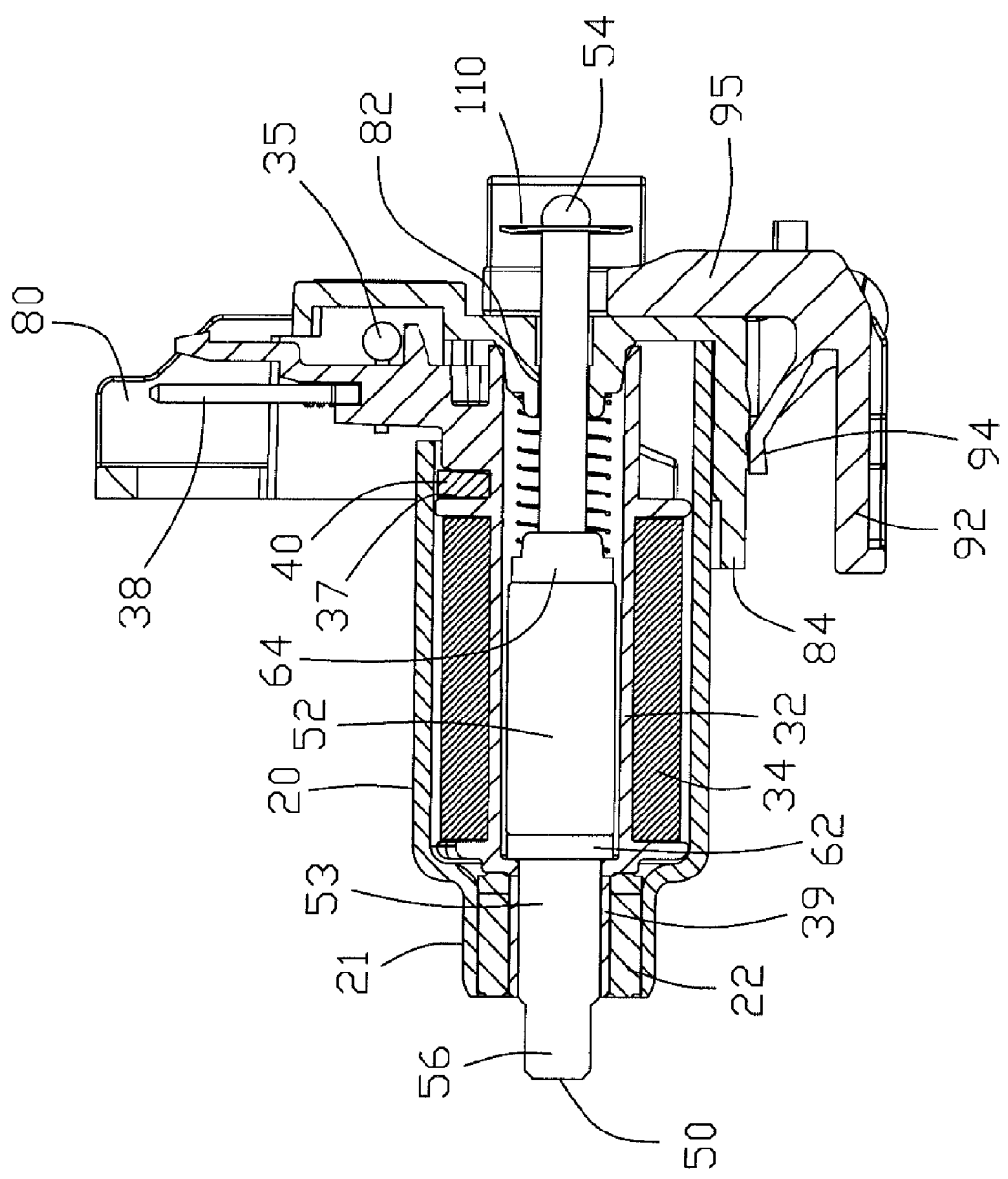
FIG. 3 is a sectional view of the solenoid of FIG. 1.
Figure 6:
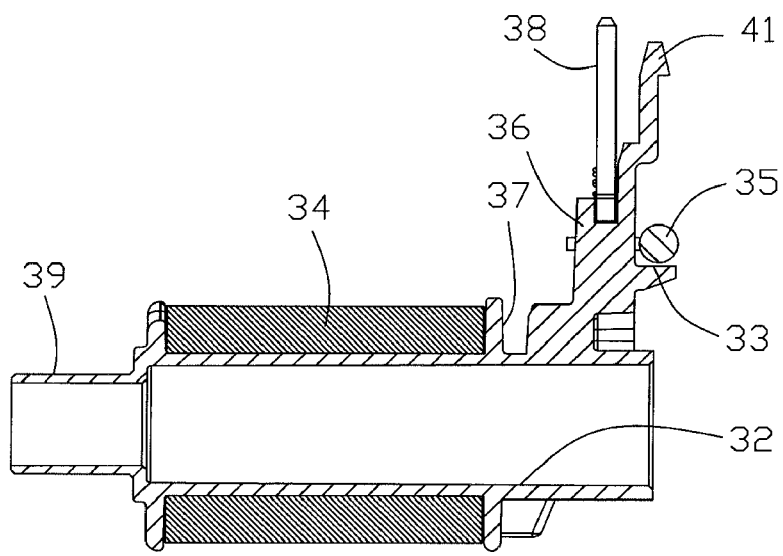
FIG. 6 is a sectional view of the coil assembly of FIG. 5.
Figures 5, 7:
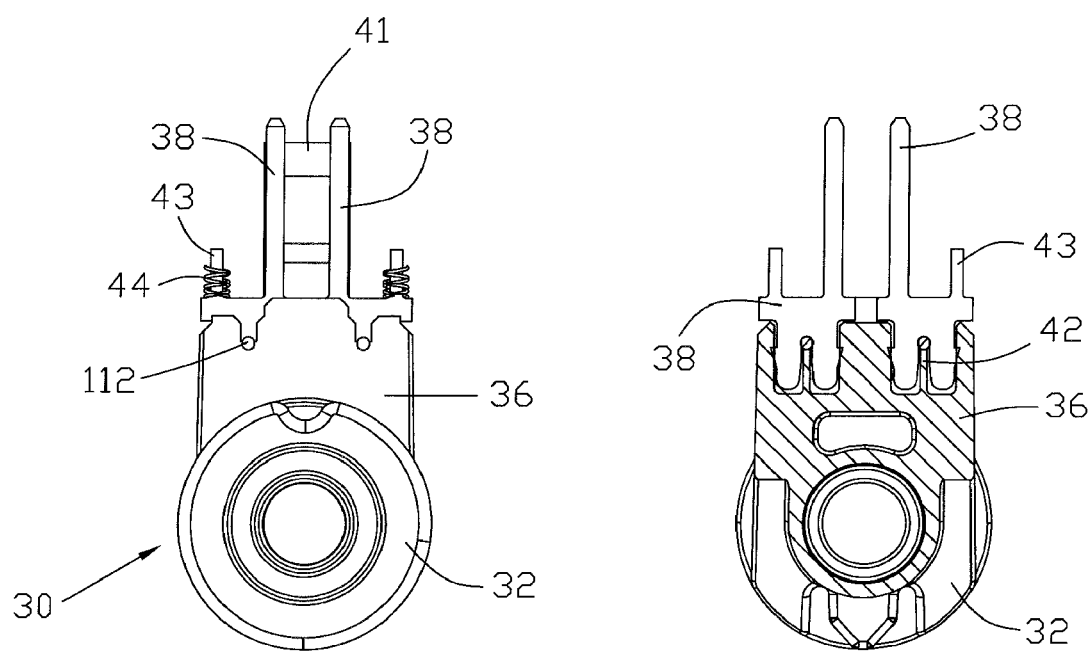
FIG. 5 is an end view of a coil assembly being a part of the solenoid of FIG. 1.
FIG. 7 is a cross-sectional view of the coil assembly of FIG. 5.

The frame 20, as shown in FIGS. 2, 3 and 4, is a drawn metal can that carries magnetic flux and is a component of the magnetic circuit of the product, as well as, the mechanical structure. One end 21 of the frame 20 has a reduced section into which is received a sintered metal bushing 22; the frame 20 locates the bushing 22 on the center line of the solenoid and with the mounting features of the connector housing 80. The other end of the solenoid has retention tabs 23 to secure the housing to the connector housing 80. The frame also serves to locate the wound bobbin/connector assembly 30 (coil assembly complete).

The bushing 22, shown in FIGS. 2, 3 and 4 is fitted to the frame 20 and consists of a powder metal sintered part made of soft magnetic material that facilitates the flow of magnetic flux in the magnetic circuit between the plunger and the frame to achieve the solenoid performance. The i.d. bore of the bushing 22 locates the bobbin 32 on the center line of the solenoid. The o.d. of the bushing is a press fit within the one end of the frame 21.

The coil assembly is shown in more detail in FIGS. 2, 3 and 5-7. The bobbin 32 is a one-piece molded plastic part which provides an area for the wound coil 34 and has channels to route the start and finish wires to the terminals 38. The bobbin 32 also has locating pockets for the terminals, a ledge 33 for seating a transient voltage device 35 (an electrical noise suppression device), a slot 37 for locating the flux ring 40, and a reduced section at one end to serve as a molded in one piece bearing 39 that fits into the bushing 22 in the one end 21 of the frame 20. To ensure proper interface connection with the customer connector, the bobbin has a connector latch feature 41 molded in reference to the terminal locating pockets.

The terminals 38 have a feature to engage the transient voltage suppression device mechanically and electrically. This eliminates the need for soldering this connection. Preferably the feature is a slot 42 sized to grip the lead wires 112 of the device as the terminals are pressed into the pockets in the bobbin. The terminals also have a feature, such as post 43, for wrapping the start and finish wires 44 from the coil in a position for welding. The primary blades on the terminals engage the customer's mating connector.

Figure 8:
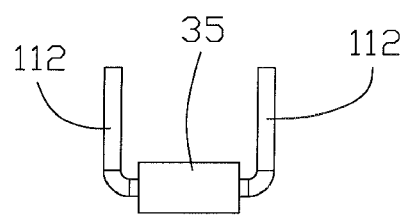
FIG. 8 illustrates an electrical noise suppression component, being a part of the solenoid of FIG. 1.

The transient voltage device 35 (electrical noise suppression device), as shown in FIG. 8, is a discrete component having two lead wires 112 which are attached to the terminals 38 as described above. The device 35 may be a resistor or a varistor type device or other suitable device for suppressing transient voltages due to the coil, which occur when switching on/off the solenoid.

The flux ring 40 shown in FIGS. 2 and 3 has a geometry that is "U" shaped to fit the bobbin so that the start and finish wires can be routed to the terminals through the opening of the flux ring 40. The flux ring location, positioned in a slot or recess 37 molded on the bobbin 32 has the function of presenting magnetic flux to the plunger 50 to obtain the correct force. The flux ring is part of the magnetic flux path between the plunger and the frame at the second end of the coil or frame.

The plunger 50 has a section 52 of maximum diameter that lies within the coil bobbin 32 in a slidable manner. The section 52 is integral with a reduced section 53 that engages the bobbin bearing 39 and a reduced shaft section 54 that engages housing bearing 82 of the connector housing 80, as shown in the sectional view of FIG. 3. The plunger 50 has a further step down diameter section 56 that is the output piece that engages with the customer's shift mechanism. Since the bearing diameter of the plunger section 52 is larger than the output diameter of section 56, deflection of the output does not result in binding of the plunger operation.

The bumpers 62 and 64 are resilient annular structures and provide noise dampening for the power on/power off stroke of the plunger 50. One bumper 62 is located between one end of the plunger section 52 and the bearing 39 of the bobbin 32. The other bumper 64 is located between the other end of the plunger section 52 and spring 70. The bumper 64 that engages the spring 70 is contoured 65 to align the spring 70 on the centerline to keep it from making surface sliding noise during cycling.

The spring 70 has one end bearing against the bumper 64 pressed against the shoulder defined between sections 52 and 54 of plunger 50, and its other end bearing against the housing bearing 82. Spring 70 returns the plunger 50 to its start position when power is removed, and also, slows the actuation force at the end of travel at "power on", reducing "power on" impact noise.

The connector housing 80 is crimped to the frame 20 via the retention tabs 23, thus securing all of the internal components in proper alignment and position. Molded integrally in the housing 80 is the bearing 82 for holding the shaft section 54 of plunger 50, the connector cover that features easy access for the mating connector, a protective pocket for the transient voltage suppression device 35 and the mounting feature for the manual release lever 90.

The manual release lever 90 provides the function of moving the plunger manually to release the park lock mechanism when there is no battery power available. The lever 90 consists of a pivotally mounted, L-shaped finger activated lever 92, pivotally mounted to the connector housing 80 via pins 93, as shown in FIGS. 1 and 2. Lever 92 is movable against spring 94 attached to the top of lever 92 and bearing against a plate 84 on the bottom of the connector housing 80, as shown in FIG. 3. The bifurcated top of up leg 95 of the lever is received around the projecting end of shaft section 54. A retaining clip 110 engages a groove 55 in the projecting end of shaft section 54 and holds up leg 95 around the shaft. When the manual release lever 92 is pressed towards the connector housing, it pivots about pins 93 and up leg 95 of the manual release lever pushes the clip/shaft/plunger outwardly of the connector housing, to the right, as shown in FIG. 3, to release the park lock mechanism. The clip 110 is a low cost commodity component that enables avoiding tooling a plastic part. Spring 94 returns the lever to the power off position after manually releasing the lock. Spring 94 may be a separate component but is preferably formed intergrally with the lever as a monolithic construction.

Lubricant is applied to the plunger to dampen noise during the power on/power off cycle as well as to keep sliding friction low.

The operation of the solenoid is as follows. When power is applied to the connector terminals 38 the solenoid coil 34 is energized producing a magnetic field that interacts with the plunger 50. The plunger 50 moves to the equilibrium position of the magnetic field. When power is removed, the magnetic field collapses and the spring 70 pushes the plunger 50 back to its original position. In the application, the solenoid in the power off position blocks the motion of the shift lever. When the solenoid is powered on, the park lock mechanism is released so that the shift lever can be moved to one of the transmission gear positions.

The invention as described above, gives certain advantages and improvements in performance. These include better sound quality performance, better retention of manual override feature, one-piece drawn-can construction, enhanced assembly due to lead-in's on drawn can housing, better physical protection for the EMC device and more reliable interference fit connection (eliminating any use of solder), optimized magnetic circuit for low cost (eliminating any permanent magnet), and integrated bearing design in the bobbin eliminating any separate sleeve bearings.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A solenoid for a park lock mechanism comprising: an annular frame having a reduced diameter at one end; a bobbin with a coil wound thereon with the bobbin projecting outward of the coil at one end and defining an integral bearing; the bobbin received in the annular frame with its integral bearing positioned in said one end of the annular frame; an elongated plunger received in said bobbin for sliding movement relative thereto; said plunger having a first reduced section at one end and a second reduced section at its other end, both of which project longitudinally out of said bobbin;

said first reduced section including an element a longitudinally outer portion extending outwardly from the bobbin for connecting to a shifter; said solenoid having two operating conditions, a first condition in which no magnetic force is applied to the plunger and a connected shifter is locked, and a second condition in which magnetic force is applied to the plunger and a connected shifter is unlocked for shifting, and a spring biases the plunger to place the solenoid in the first condition; said solenoid further comprising a manual release coactinq with the plunger for putting the solenoid into the second condition in the absence of power wherein the second reduced section of the plunger is provided with a groove and a retaining clip is received in the groove and coacts with the manual release.

2. The solenoid as defined in claim 1, further comprising a magnetic permeable sintered metal bushing interposed between the integrated bearing of the bobbin and the said one end of the annular frame.

3. The solenoid as defined in claim 1, wherein a connector housing is provided for the annular frame and solenoid, said connector housing providing a bearing for holding the second reduced section of the plunger.

4. The solenoid as defined in claim 3, wherein the bobbin supports terminals for connecting the coil to supply leads, the terminals being received in the connector housing.

5. The solenoid as defined in claim 1, wherein a U-shaped magnetically permeable washer is located about one end region of the bobbin adjacent the second end of the annular frame.

6. The solenoid as defined in claim 1, wherein a bumper coacts with the spring and the plunger to reduce noise and absorb impact.

7. The solenoid as defined in claim 1, wherein a bumper is mounted on the second reduced section of the plunger to reduce noise and absorb impact as the solenoid returns to the first condition.

8. A solenoid for a park lock mechanism comprising: an annular frame having a reduced diameter at one end;
a bobbin with a coil wound thereon with the bobbin projecting outward of the coil at one end and defining an integral bearing; the bobbin received in the annular frame with its integral bearing positioned in said one end of the annular frame; an elongated plunger received in said bobbin for sliding movement relative thereto; said plunger having a first reduced section at one end and a second reduced section at its other end, both of which project longitudinally out of said bobbin; said first reduced section including an element a longitudinally outer portion extending outwardly from the bobbin for connecting to a shifter; said solenoid having two operating conditions, a first condition in which no magnetic force is applied to the plunger and a connected shifter is locked, and a second condition in which magnetic force is applied to the plunger and a connected shifter is unlocked for shifting, and a spring biases the plunger to place the solenoid in the first condition; said solenoid further comprising a manual release coactinq with the plunger for putting the solenoid into the second condition in the absence of power wherein the manual release is comprised of an L-shaped lever that is pivotally mounted on the solenoid with one leg being the actuating leg and the other leg coacting with the plunger for unlocking the solenoid.

9. The solenoid as defined in claim 8, wherein a spring integrally formed with the lever, biases the lever to a locked position.

10. The solenoid as defined in claim 8 further comprising a magnetic permeable sintered metal bushing interposed between the integrated bearing of the bobbin and the said one end of the annular frame.

11. The solenoid as defined in claim 8 wherein a connector housing is provided for the annular frame and solenoid, said connector housing providing a bearing for holding the second reduced section of the plunger.

12. The solenoid as defined in claim 11, wherein the bobbin supports terminals for connecting the coil to supply leads, the terminals being received in the connector housing.

13. The solenoid as defined in claim 8, wherein a U-shaped magnetically permeable washer is located about one end region of the bobbin adjacent the second end of the annular frame.

14. The solenoid as defined in claim 8, wherein a bumper coacts with the spring and the plunger to reduce noise and absorb impact.

15. The solenoid as defined in claim 8, wherein a bumper is mounted on the second reduced section of the plunger to reduce noise and absorb impact as the solenoid returns to the first condition.

* * * * *